United States Patent [19]

Steinhagen et al.

[11] Patent Number: 5,016,724

[45] Date of Patent: May 21, 1991

[54] INTER-AXLE DIFFERENTIAL HAVING A FRICTION-TYPE BIASING CLUTCH AND WHEEL SLIP SENSING CONTROL MEANS THEREFOR

[75] Inventors: Horst G. Steinhagen; Paul C. Blank, both of Rockford, Ill.

[73] Assignee: Twin Disc, Incorporated, Racine, Wis.

[21] Appl. No.: 390,777

[22] Filed: Aug. 8, 1989

[51] Int. Cl.$^5$ .............................................. B60K 17/35
[52] U.S. Cl. ..................................... 180/197; 180/248
[58] Field of Search ................ 180/197, 248, 249, 250

[56] References Cited

U.S. PATENT DOCUMENTS

| | | | |
|---|---|---|---|
| 4,467,886 | 8/1984 | DeClaire et al. | 192/4 A X |
| 4,552,241 | 11/1985 | Suzuki | 180/249 |
| 4,754,835 | 7/1988 | Stelter et al. | 180/248 |
| 4,776,421 | 10/1988 | Kashihara | 180/249 X |

Primary Examiner—Richard A. Bertsch
Assistant Examiner—Victor E. Johnson
Attorney, Agent, or Firm—Nilles & Nilles

[57] ABSTRACT

A four-wheel drive vehicle comprises an engine and a power transmission system, including a shiftable change gear transmission having a power input shaft and a differential having front and rear output shafts and a biasing clutch, for driving the front and rear vehicle wheels. The differential, with biasing clutch disengaged, allows for differences in rotational speed between the front and rear wheels. Increased speed of one output shaft as may be caused by its' associated wheels slipping, results in decreased speed of the other output shaft. Conversely, decreased speed of one output shaft as may be caused by its' associated wheels being bogged down by mud, sand or deep snow, results in increased speed of the other output shaft. The degree of differential action may be determined from the known input shaft speed, the gear ratio engaged and an output shaft speed. A control system, which includes a microprocessor, employs sensors to directly sense the speed differences between the power input shaft of the transmission and only one of the output shafts of the differential and effects temporary biasing clutch engagement in the event of excessive slippage for a predetermined interval of time. The control system also senses the selected gear range of the transmission. The microprocessor periodically samples the speed ratio between those two shafts, compensating for the gear range selected, and compares it to a preselected (adjsutable) ratio in the microprocessor memory. If the preselected ratio band is deviated from for a selected interval of time, the microprocessor effects clutch lockup for a selected interval of time so that both output shafts of the differential (and the front and rear wheels) rotate at the same speed and wheel slippage is eliminated.

9 Claims, 6 Drawing Sheets

INTER-AXLE DIFFERENTIAL HAVING A FRICTION-TYPE BIASING CLUTCH AND WHEEL SLIP SENSING CONTROL MEANS THEREFOR

BACKGROUND OF THE INVENTION

1. Field of Use

The present invention relates to a power transmission system for a four-wheel drive vehicle and to control means therefor.

The power transmission system, which is connected to the vehicle engine to drive the front and rear vehicle wheels, comprises a shiftable change gear transmission and an inter-axle differential, including a biasing clutch. The control means sense slippage between the front and rear vehicle wheels and effect temporary clutch lockup to cause the front and rear wheels to rotate at the same speed.

2. Description of the Prior Art

U.S. Pat. No. 3,894,446, issued July 15, 1975 to Snoy et al entitled "Power Transmission Having Friction Clutch Bias Differential With Automatic Clutch Release" and assigned to the same assignee as the present invention, discloses a power transmission system having a change gear mechanism and an inter-axle differential mechanism. That patent discloses a hydro-mechanical control means, including a valve, to sense clutch slipping and to effect disengagement of the clutch in the event thereof. More specifically, U.S. Pat. No. 3,894,446 discloses a power transmission for a four-wheel vehicle in which both the front and rear wheels are driven by the front and rear output shafts, respectively, of the inter-axle differential. That differential is equipped with a modulatable slippable friction clutch that provides a predetermined amount of torque differential or torque bias between the two output shafts of the differential for accommodating slipping conditions. The amount of the torque bias is determined by the load capability of the drive train which is located downstream of the differential, and the clutch serves to protect the drive train from excessive loads. Thus, when the predetermined torque value is attained, the clutch will slip. Control means are provided for sensing the slipping of the friction clutch and operate to completely release (i.e., disengage) the friction clutch prior to the attaining of high slip speed values. This control recognizes rotational speed differences between the two (front and rear) drive shafts and, as a result, releases the friction clutch when a predetermined torque value develops, thereby preventing continuous slip of the clutch at high slip speed values and rated torque which would otherwise cause failure of the clutch.

The prior art also includes U.S. Pat. No. 4,552,241, issued Nov. 12, 1985 to Suzuki entitled "Four-Wheel Drive System With Center Differential Lock Control Responsive to RPM Difference" and assigned to Nissan Motor Company, which discloses a four-wheel drive system for a vehicle which has a center differential between the front wheels and rear wheels, and means for restraining or locking the center differential. The four-wheel drive system is combined with a control system for automatically locking the center differential when the difference between an average rotational speed of the right and left front wheels and an average rotational speed of the right and left rear wheels becomes equal to or larger than a predetermined value. The control system in U.S. Pat. No. 4,552,241 is relatively complex and employs five different sensors, namely: a front right wheel RPM sensor; a front left wheel RPM sensor; a rear right wheel RPM sensor; a rear left wheel RPM sensor; and a condition of center differential sensor.

Other U.S. Pat. Nos. illustrating the state of the art are: 3,748,928; 3,792,628; 4,467,886 and 4,761,043.

SUMMARY OF THE PRESENT INVENTION

The present invention provides an improved power transmission system for use in a four-wheel drive vehicle, such as a rapid intervention fire-fighting truck, which has an engine with a torque converter thereon for driving the front and rear wheels through the power transmission system.

The power transmission system comprises a selectively shiftable gear change transmission driven by the torque converter and an inter-axle differential, including a selectively operable biasing or lockup clutch, driven by the transmission to drive front and rear drive shafts for the front and rear vehicle wheels, respectively.

The transmission comprises a power input shaft rotatably driven by the torque converter and connected to the differential through a series of constant mesh gears. The transmission is shiftable into several gear ranges by selectively operable transmission clutch packs.

The differential comprises a gear which is rotatably driven by the last gear in the transmission and which, in turn, rotatably drives a pinion carrier. The pinion carrier, in turn, rotatably drives front and rear differential output shafts which are connected to the front and rear drive shafts, respectively, for the vehicle wheels.

The biasing or lockup clutch is operatively connected between the rotatable pinion carrier and one of the differential output shafts, as in U.S. Pat. No. 3,894,446. The differential, with the biasing clutch unlocked (disengaged), allows for differences in rotational speeds between the front and rear wheels. Increased speed of one output shaft as may be caused by its' associated wheels slipping, results in decreased speed of the other output shaft. Conversely, decreased speed of one output shaft as may be caused by its' associated wheels being bogged down by mud, sand or deep snow, results in increased speed of the other output shaft. In accordance with the invention, the degree of differential action may be determined from the known input shaft speed, the gear ratio engaged and an output shaft speed. Such slippage is accompanied by differences in rotational speeds between the front and rear differential output shafts which can cause loss of traction, if excessive. The biasing clutch, when locked (engaged), causes the said one differential output shaft to be directly driven by the pinion carrier. As a result, both differential output shafts (and the wheels driven thereby) rotate at the same speed, and wheel slippage is eliminated, thereby affording better vehicle mobility.

The transmission clutch packs and the biasing clutch, as disclosed herein, each take the form of a friction-type clutch which is hydraulically operated between fully disengaged and fully engaged positions by means of an electrically operated solenoid valve.

Control means are provided to selectively operate the transmission clutch packs and effect shifting into desired gear ranges. The control means also selectively operate the biasing clutch to overcome wheel slippage.

More specifically, the control means are responsive to a predetermined speed ratio between the transmission power input shaft and one of the differential output shafts, taking into account the selected gear range, indicative of excessive or undesired slippage between the front and rear wheels to effect temporary lockup of the biasing clutch and eliminate wheel slippage.

The control means generally comprise a plurality of signal input devices including a gear range selector switch; first and second sensors to detect the rotational speeds of the transmission power input shaft and one of the differential output shafts, respectively; a biasing clutch function selector, such as a switch; a speed ratio adjuster; a timing selector; and an electronic central processing unit (CPU) which includes a memory circuit and a timing means or circuit and receives electric input signals from the input devices.

The CPU receives electric signals from the gear range selector switch and provides output signals to operate the appropriate transmission clutch packs to provide a desired gear range. The CPU generates an internal electric signal indicative of the gear range selected.

The CPU also continuously receives signals from the first sensor, adjusts it in accordance with the internal electric signal indicative of the gear range selected, processes the adjusted signals from the first sensor and the signals from the second sensor to provide an actual speed ratio, and periodically compares the actual speed ratio with a predetermined preferred speed ratio entered into the memory by the speed ratio adjuster. The CPU recognizes a discrepancy indicative of excessive wheel slippage and provides a control signal to effect full engagement of the biasing clutch for a short preadjusted interval of time (established by the timer adjustment control to account for various types of operating conditions which cause slippage), provided that the slippage occurs for a preadjusted interval of time (also established by the timer adjustment control). Lockup of the biasing clutch causes the two differential output shafts (and the wheels driven thereby) to rotate at the same speed and eliminates wheel slippage.

The CPU continuously samples and re-analyzes updated input signals from the input devices to ascertain if excessive slippage is occurring for a predetermined interval of time and, if so, again effects clutch lockup for a desired interval of time.

The present invention offers several advantages over the prior art. For example, prior art control means for transmission systems already typically employ a first sensor for detecting the rotational speed of the power input shaft of the transmission because this information is usable for a variety of purposes other than for controlling a biasing clutch. Furthermore, some prior art control systems employ at least two additional sensors to control the biasing clutch: one for detecting the speed of one differential output shaft, and the other for detecting the speed of the other differential output shaft. This prior art arrangement then requires control circuitry for processing at least the two input signals from the two additional sensors. In contrast, the present invention employs the already existing first sensor for the power input shaft of the transmission which, as far as is presently known, has not heretofore been used directly in effecting biasing clutch control. Furthermore, the present invention employs only one sensor for one differential output shaft. The present invention derives speed information pertaining to the unmonitored differential output shaft based in a calculation involving the actual speed of the transmission power input shaft, as corrected in accordance with a selected gear range and known gear ratios. This results in a less complex and less costly control system. The biasing clutch is lockable while the vehicle is in motion and stopping the vehicle to achieve lockup is not required, as is the case in some prior art systems.

Other objects and advantages of the invention will hereinafter appear.

DESCRIPTION OF A PREFERRED EMBODIMENT

General Arrangement

Figure 1:
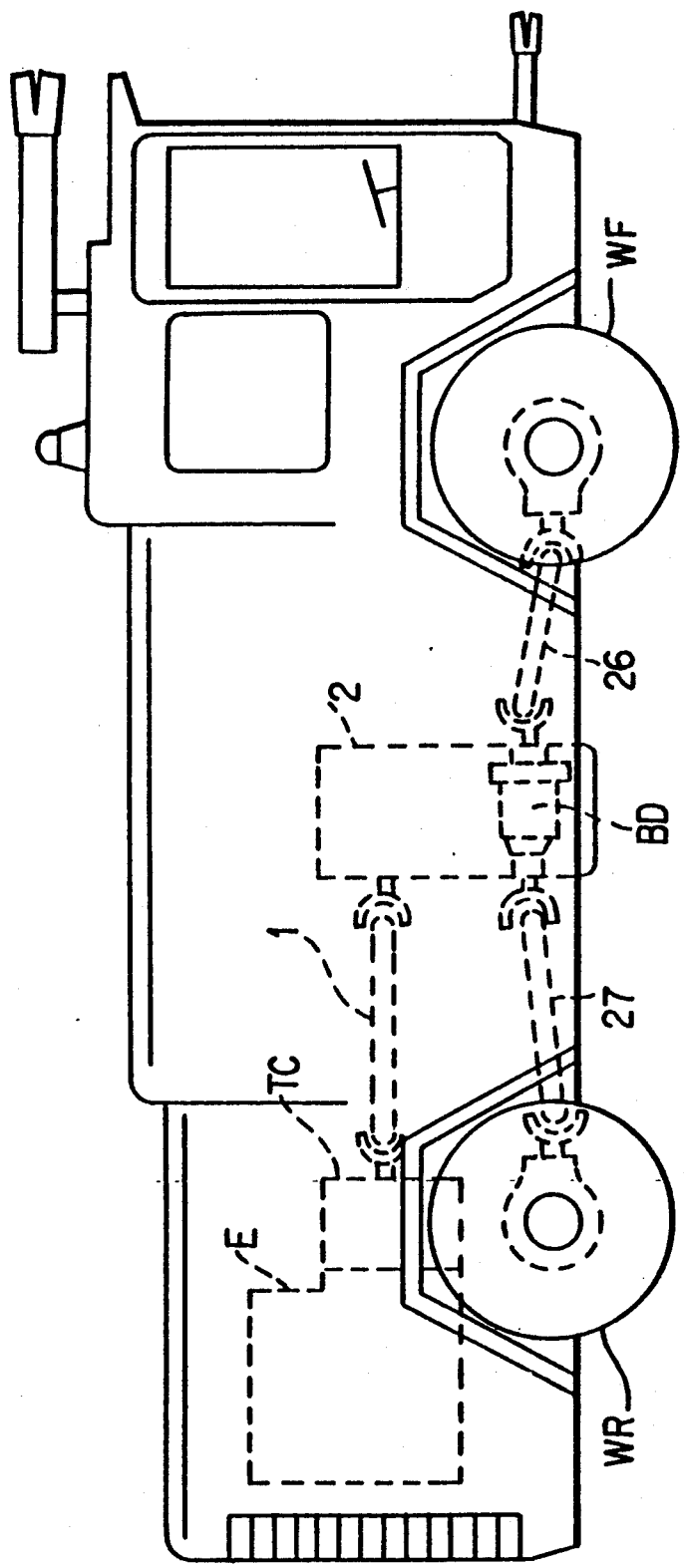
FIG. 1 is a side elevational view of a four-wheel drive vehicle, such as a rapid intervention fire-fighting truck, which embodies a power transmission system in accordance with the present invention.

Referring to FIG. 1, the present invention provides an improved power transmission system which is especially well-adapted for use in a four-wheel drive vehicle T, such as a rapid intervention fire-fighting truck, which has an engine E with a torque converter TC thereon and front wheels FW and rear wheels RW driven thereby through the power transmission system. However, the improved power transmission system could have other application.

The power transmission system, as applied to a four-wheel drive vehicle T, comprises a selectively shiftable gear change transmission 2 driven by an output shaft 1 of torque converter TC on engine E and an inter-axle differential BD, including a biasing or lockup clutch 28, and driven by transmission 2 to drive front and rear drive shafts 26 and 27 for the front and rear vehicle wheels FW or RW, respectively. The transmission 2 and biasing differential BD are both mounted in a transmission housing 8 shown in FIG. 2.

Figure 2:
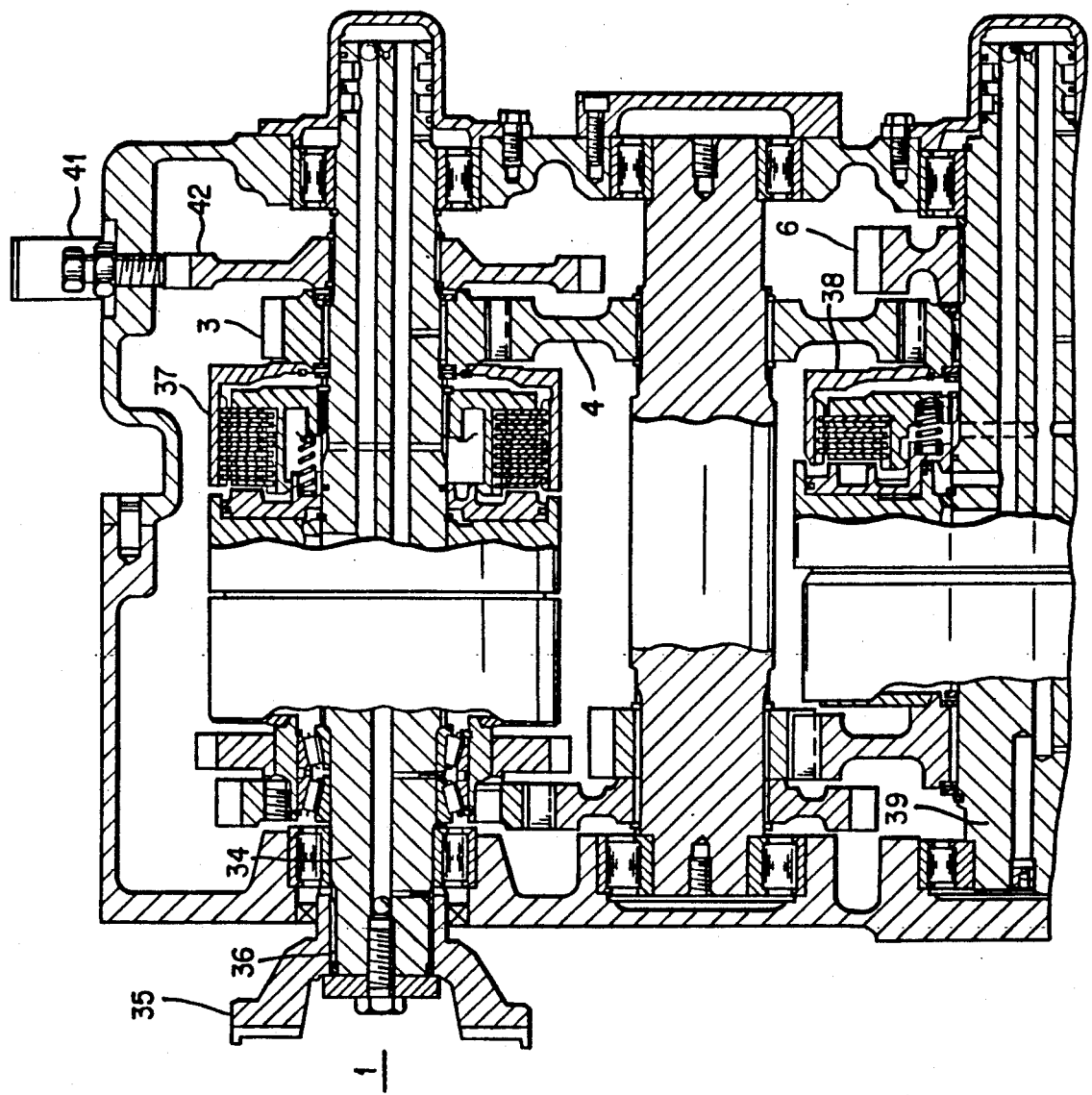
FIG. 2 is an enlarged cross-sectional view of a transmission mechanism and an inter-axle differential mechanism shown in FIG. 1.
Figure 2:
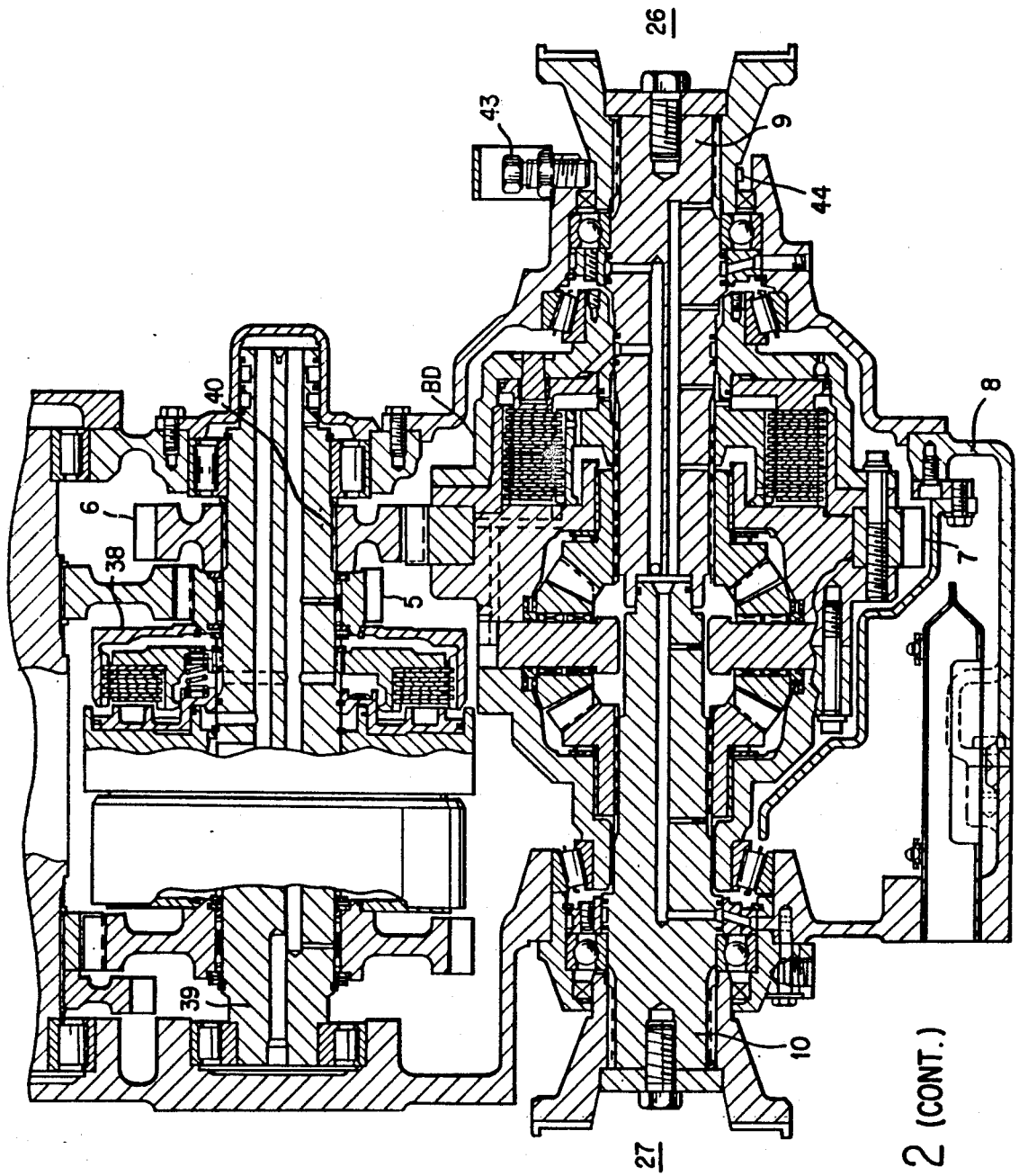

Referring to FIG. 2, the transmission 2 comprises a power input shaft 34 rotatably driven by output shaft 1 of engine torque converter TC. Shaft 34 is connected to differential BD through a series of constant mesh gears 3, 4, 5 and 6 of transmission 2 which is shiftable into several gear ranges by selectively operable transmission clutch packs 37 and 38.

Figure 3:
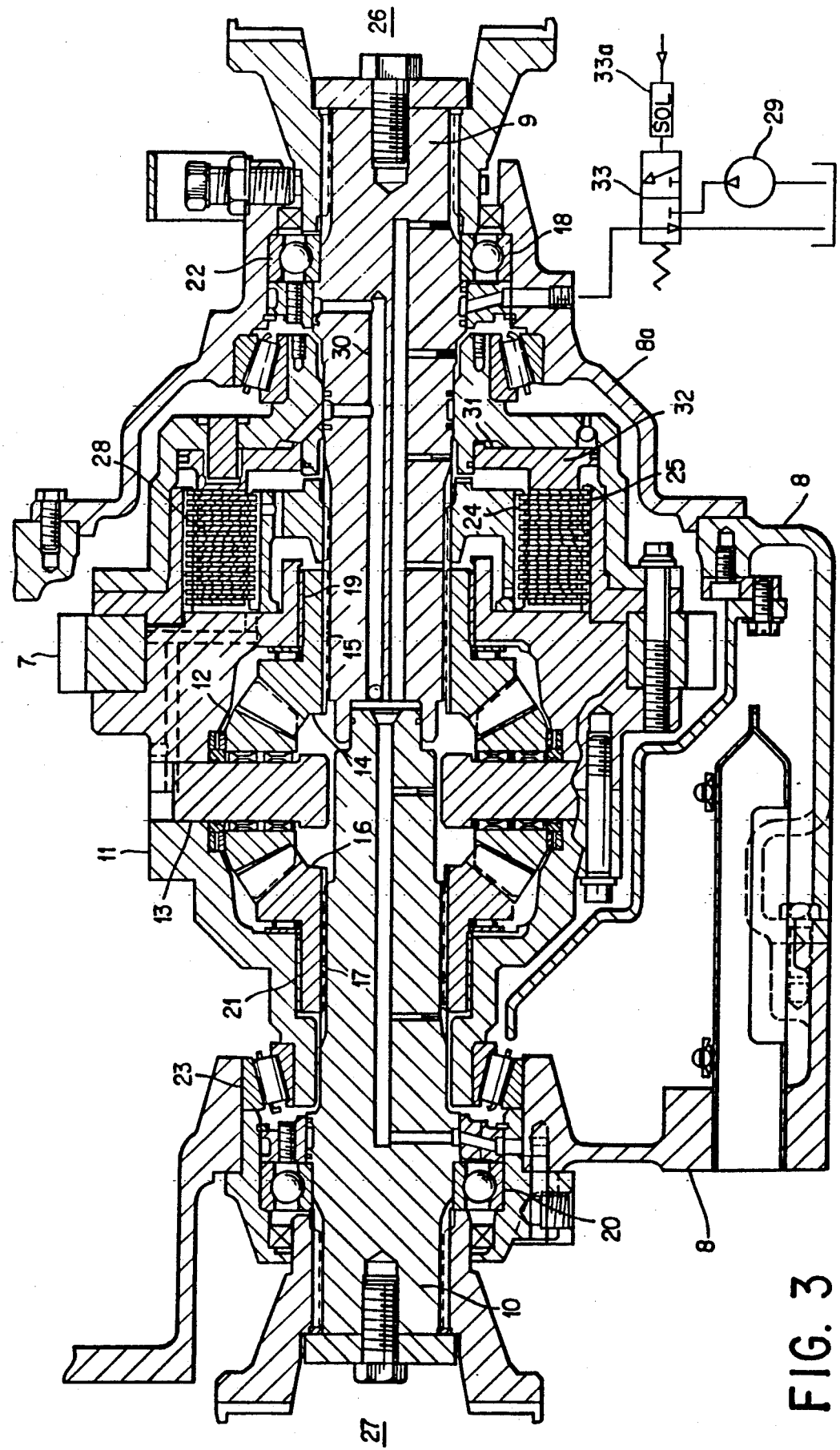
FIG. 3 is an enlarged longitudinal cross-sectional view through the transfer case which houses the inter-axle differential shown in FIG. 2.

Referring to FIGS. 2 and 3, the differential BD, located in the lower portion 8a of housing 8, comprises a rotatable gear 7 which is driven by gear 6 on power output shaft 39 of transmission 2 and which rotatably drives a pinion carrier 11. Pinion carrier 11, in turn, connected to and acting through differential bevel gearing, rotatably drives front and rear differential output shafts 9 and 10, respectively, which are connected to the front and rear drive shafts 26 and 27, respectively, for the vehicle wheels. The differential BD further comprises the selectively operable biasing or lockup clutch 28 which is operatively connected between rotatable pinion carrier 11 and one (i.e. shaft 9) of the differential output shafts 9 and 10. The differential BD, with the biasing clutch 28 disengaged (unlocked), allows for differences in rotational speeds of the front and rear output shafts 9 and 10, but not for the purpose of allowing slippage. The main function of the differential BD is to prevent wheel slippage when the vehicle is in a turn and the rotational speeds of the front and rear output shafts 9 and 10 are different as dictated by the different distances traveled by the front and rear tires. Then, as a result of the differential action, a high rate of wheel slippage can occur when one set of wheels FW and RW encounters icy pavement. The differential allows for differences in rotational speeds between the front and the rear wheels FW and RW. Increased speed of one output shaft as may be caused by its' associated wheels slipping, results in decreased speed of the other output shaft. Conversely, decreased speed on one output shaft as may be caused by its' associated wheels being bogged down by mud, sand or deep snow, results in increased speed of the other output shaft. The degree of differential action may be determined from the known input shaft speed, the gear ratio engaged and an output shaft speed. The biasing clutch 28, when locked or engaged, causes the said one differential output 9 shaft to be directly driven by pinion carrier 11 and, as a result, both differential output shafts 9 and 10 (and the wheels FW and RW, respectively, driven thereby) rotate at the same speed and slippage is eliminated, thereby affording better vehicle mobility.

Referring to FIG. 2, in the preferred embodiment disclosed, the transmission clutch packs 37 and 38 and biasing clutch 28 each take the form of a friction-type clutch which is hydraulically operated between fully disengaged and fully engaged positions by means of an electronically operated solenoid valve. Clutch 28 is controlled by solenoid valve 33, hereinafter described, and clutch packs 37 and 38 are controlled by valves 37A and 38A, respectively (see FIG. 4).

Figure 4:
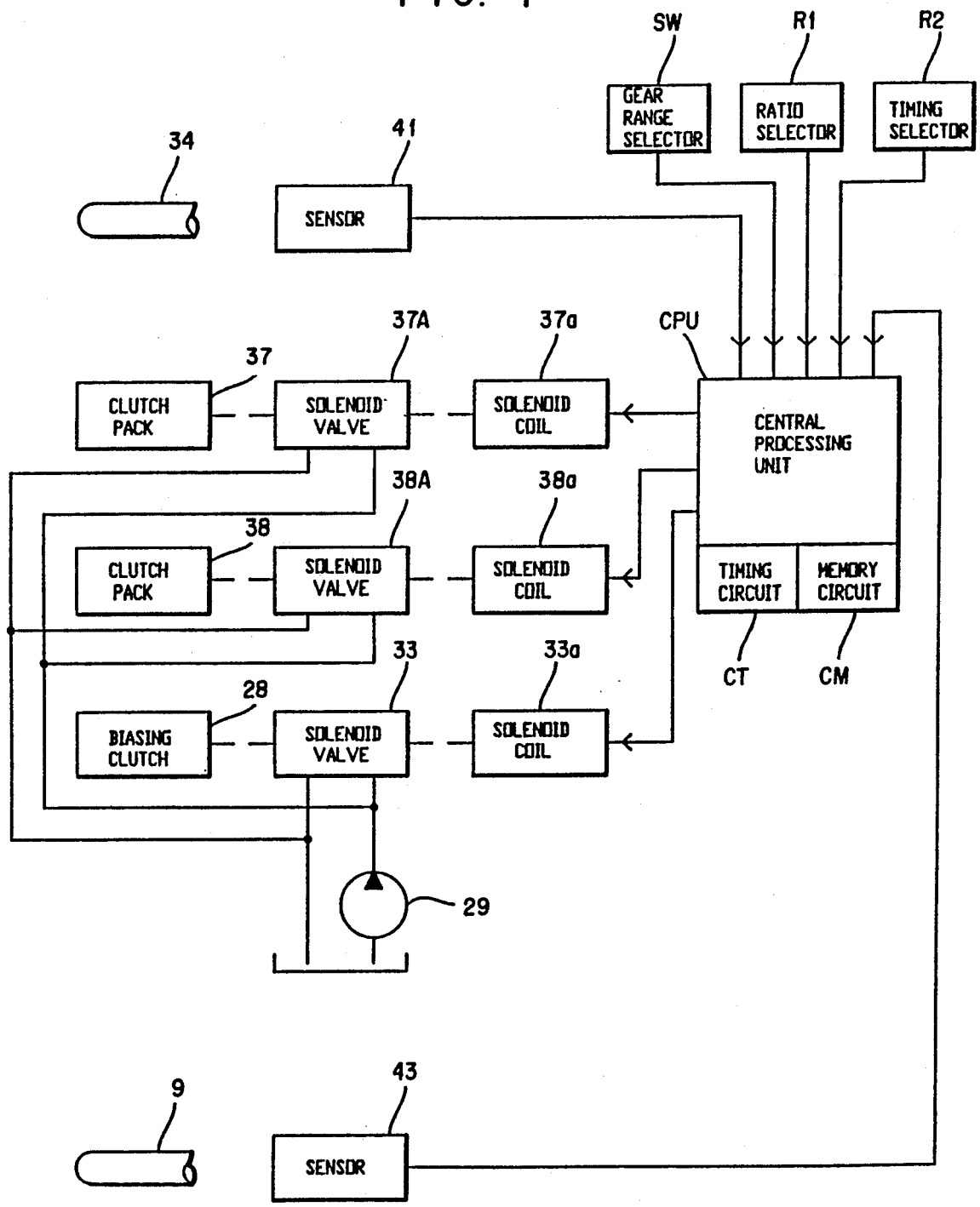
FIG. 4 is a schematic circuit diagram of the control means for the power transmission system.
Figure 5:
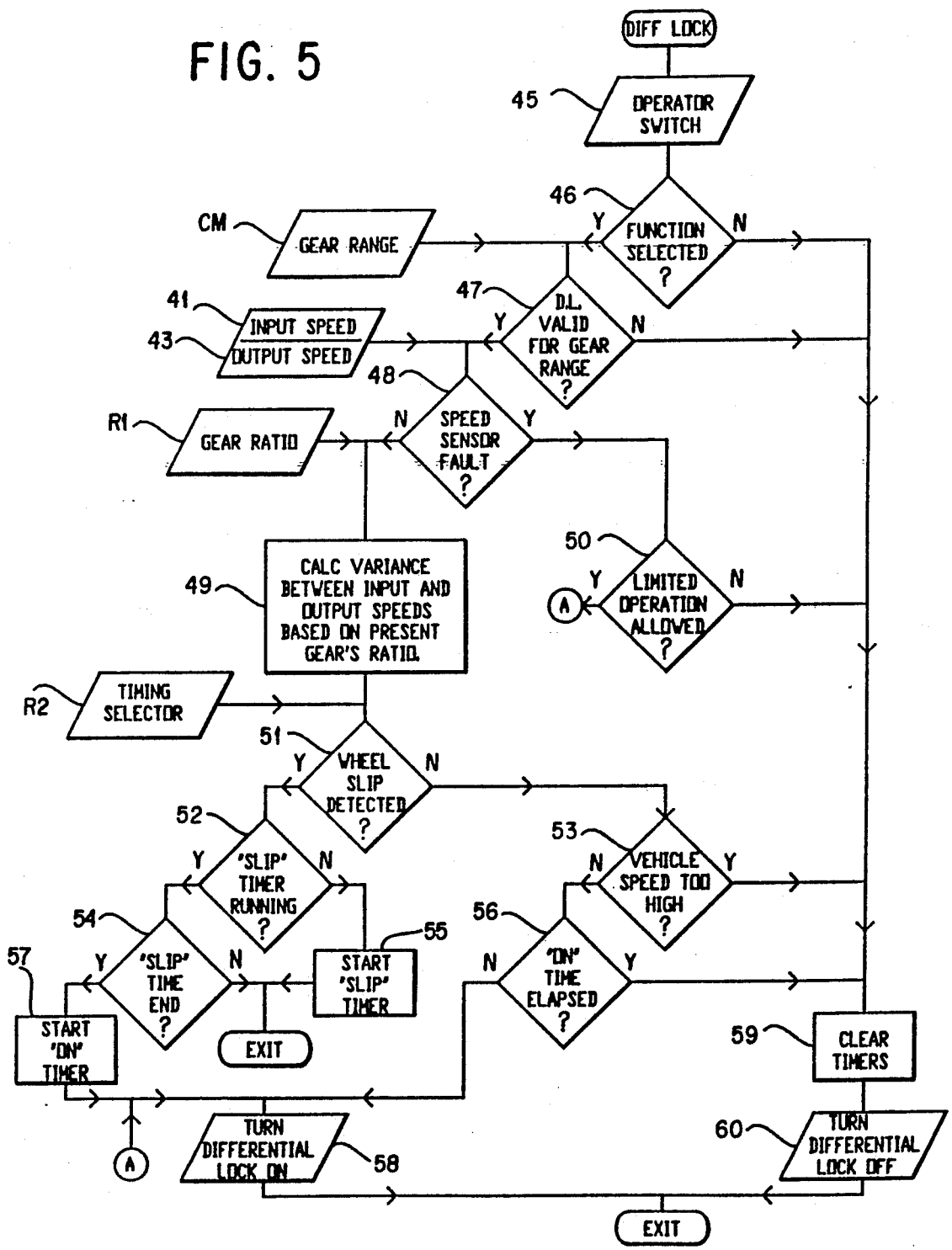
FIG. 5 is a schematic diagram of the functions of the control means for the power transmission system of FIGS. 1, 2 and 3.

Referring to FIGS. 3, 4 and 5, control means are provided to selectively operate the transmission clutch packs 37 and 38 and effect shifting of transmission 2 into desired gear ranges and to selectively operate biasing clutch 28 to overcome wheel slippage.

More specifically, the control means are responsive to a predetermined speed ratio between power input shaft 34 of transmission 2 and one (i.e. shaft 9) of the differential output shafts 9 and 10, taking into account the shift range selected for transmission 2, indicative of slippage between the front and rear wheels to effect temporary lockup of biasing clutch 28 and eliminate wheel slippage.

Transmission

Transmission 2 comprises a power input shaft 34, a series of constant mesh gears 3, 4, 5 and 6, a pair of clutch packs 37 and 38, and a power output shaft 39 on which gear 6 is mounted. The clutch packs 37 and 38 are selectively operable to shaft transmission 2 into various gear ranges. Assuming that power input shaft 34 rotates at a given speed, power output shaft 39 will rotate at some known proportional speed which depends on the gear range selected. Thus, signal information indicative of the rotational speed of power input shaft 34, combined with additional signal information (i.e. an internal signal in the CPU) as to which clutch packs 37 and 38 are engaged and/or disengaged, is indicative of the rotational speed of transmission power output shaft 39, the gear 6 therein and the differential gear 7 meshed therewith.

The change speed transmission 2, shown clearly in FIG. 2, employs a series of hydraulically actuated friction clutches or clutch packs 37 and 38 for changing speed and direction of the output gear 7 by selectively engaging various gear combinations associated with these clutches. It is deemed sufficient to say for the purpose of this disclosure, that power is transmitted from shaft 1 to the transmission input shaft 34 via flange 35 and splined connection 36. By selectively engaging clutch pack 37, gear 3 is rotatably connected to input shaft 34 and transmits power via gears 4 and 5 and the selectively engaged clutch pack 38 to shaft 39. Shaft 39 has a spline connection 40 with gear 6 and power is transmitted from shaft 39 via spline 40 to gear 6 and further to gear 7 of the differential BD.

Speed sensing means 41 and the teeth of gear 42 which is rotatably connected to the transmission input shaft 34 provide for a frequency input signal to an electronic central processing unit CPU of the control means, shown in FIG. 4, that is proportional to the transmission input speed. Speed sensing means 43 and the teeth of output flange 44 which is rotatably connected to the transmission from output shaft 9 provide for a frequency input signal to central processing unit CPU that is proportional to the front output shaft 9 rotational velocity.

Range selection of the power transmission 2 is accomplished by selective engagement of the clutches 37 and 38, which is effected by individual clutch solenoid control valves 37A and 38A. The range selection is primarily based upon the rotational velocity of shaft 9, as sensed by speed sensor 43. This information is used by central processing unit CPU to activate the appropriate solenoid valves 37 and/or 38. The same information from speed sensor 41 is employed by central processing unit CPU to control biasing clutch 28.

The front and rear output shaft torques of a 50/50 differential with the biasing clutch disengaged are always theoretically equal. The unequal rotational velocity of the shafts comes from variations in the tire rolling radii, different tire travel distances during turns, and from wheel slip. Therefore, the speeds are rarely completely equal.

In a 50/50 differential of the type described herein, the sum of the front 9 and rear 10 differential output shaft rotational velocities is two times the differential BD input speed or, in this case, the speed of gear 7. This means that if, for example, the front output shaft 9 rotational velocity is less than that of gear 7, the rotational velocity of the rear output shaft 10 must by necessity be faster than gear 7 by the same amount, thus, comparing the rotational velocity of either shaft 9 or shaft 10 against the rotational velocity of gear 7 is sufficient to detect wheel slip.

Differential

Referring to FIG. 3, differential BD comprises a relatively stationary housing 8 and 8a, a rotatable gear 7 in constant mesh with gear 6 of transmission 2, the pinion carrier 11 which is rotatable by and with gear 7, the rotatable front output shaft 9 connected to drive front power shaft 26 of vehicle T and the rotatable rear output shaft 10 connected to drive rear power shaft 27 of the vehicle. Clutch 28 is operatively connected between pinion carrier 11 and front output shaft 9.

Gear 7 is rigidly fixed to and rotatably connected to pinion carrier 11 which carries a series of beveled pinions 12 that are rotatably mounted on their stub shafts 13 fixed within the rotatably mounted pinion carrier 11. The beveled pinions 12 are in constant mesh with a beveled gear 14 which is fixed by spline means 15 to front output shaft 9. The beveled pinions 12 are also in constant mesh with a beveled gear 16 which is splined at 17 to rear output shaft 10.

Shaft 9 is journaled in the lower half of transmission housing 8a by an anti-friction bearing assembly 18 and also by gear 14 which is journaled in the sleeve bearing 19 in carrier 11. Shaft 10 is journaled in an anti-friction bearing assembly 20 in housing 8 and also by a beveled gear 16 which is journaled in sleeve bearing 21. The carrier 11 is journaled in the housing 8a and 8 by anti-friction bearing assemblies 22 and 23.

Biasing Clutch

Referring to FIG. 3, disc-type friction biasing clutch 28 is interposed between carrier 11 and shaft 9 so that a releasable connection is provided between carrier 11 and shaft 9 through their respective inter-leaved friction clutch plates 24 and 25. Fluid control means are provided for actuating clutch 28 by controlling the flow of clutch-apply fluid pressure from a pressure source such as a fluid pump 29, through solenoid actuated control valve 33 and passage means 30 to a piston actuating chamber 31. Pressurization of chamber 31 causes a clutch piston 32 to engage or compress the stack of friction plates 24 and 25 in the known manner.

With the above general arrangement, when the clutch 28 is engaged, the shafts 9 and 10 are both driven by the differential bevel gears and power is furnished to the front wheels FW through shaft 9 and the front power shaft 26, while power is also transmitted through shaft 10 and through the rear power shaft 27 into the rear wheels RW, since the beveled pinions 12 are prevented from turning on their stub shafts 13 by the locking action of biasing clutch 28.

Clutch Control Means

Referring again to FIGS. 2, 3 and 4, pressure fluid control means are provided for regulating the pressure fluid to biasing clutch 28. More specifically, clutch engagement is determined by the amount of wheel slip which in turn is indicated by the speed ratio between shaft 9 and shaft 10 of the biasing differential BD.

As FIG. 3 shows, the three-way solenoid valve 33 is interposed between the pressure fluid supply means pump 29 and the clutch apply passage 30. A signal from the central processing unit CPU of the control means (see FIG. 4) is fed to the solenoid coil 33a of control valve 33 thereby effecting clutch engagement by connecting the pump 29 discharge line to the clutch cavity or piston activity actuating chamber 31, shown in FIG. 3.

Control Means Arrangement and Operation

Referring to FIG. 4, control means are provided for operating the clutch packs 37 and 38 of transmission 2 and the biasing clutch 28 of differential BD in accordance with the invention. The control means comprise the source 29 of pressurized hydraulic fluid for operating the clutches 37, 38 and 28; three solenoid-operated control valves 37A, 38A and 33 for controlling hydraulic fluid to and from their respective clutches; and three electrically operated solenoids 37a, 38a and 33a for their respective control valves.

The control means further comprise a manually-operated gear range selector switch SW; a first sensor 41 to detect the rotational speed of transmission power input shaft 34; a second sensor 43 to detect the rotational speed of 9 and 10 one (i.e. shaft 9) of the differential output shafts; a speed ratio adjuster R1; a timer control R2 (optionally manually adjustable); and an electronic central processing unit (CPU) which includes a memory circuit CM and a timing circuit CT.

The CPU receives electric signals from gear range selector switch SW and provides output signals to operate the appropriate transmission clutch packs 37 and 38 to provide a desired gear range. The CPU generates an internal electric signal indicative of the gear range selected.

The CPU also receives electric signals from the two speed sensors 41 and 43 indicative of the rotational speeds of the shafts 34 and 9, respectively. The CPU processes the signal from first sensor 41, indicative of the rotational speed of transmission power input shaft 34, and the internal signal indicative of the gear range selected and provides an adjusted signal pertaining to the speed of the transmission power input shaft 34.

The CPU also receives electric input signals from the manually-operated speed ratio adjuster R1, indicative of a predetermined preferred speed ratio that should exist between the adjusted speed of transmission power input shaft 34 and the said one differential output shaft 9 under various vehicle operating conditions, and stores it in memory circuit CM. The predetermined preferred ratio is a known value selected from a range of known values based on the particular design of the power transmission system and knowledge of vehicle behavior under various slip-inducing conditions.

The CPU processes the adjusted speed signal of transmission power input shaft 34 and the speed signal from second sensor 43 indicative of the rotational speed of the said one differential output shaft 9 to provide an actual speed ratio signal.

The CPU then periodically compares the actual speed ratio signal to the predetermined acceptable ratio signal range stored in memory circuit CM. If the actual speed ratio signal does not fall into the predetermined acceptable range, then excessive wheel slippage is recognized. If such slippage occurs for some selected predetermined (adjustable) interval of time, then the CPU provides a control signal to solenoid valve 33 for biasing clutch 28 to effect full engagement of the biasing clutch and thereby cause both differential output shafts 9 and 10 (and wheels FW and RW, respectively, driven thereby) to rotate at the same speed and eliminate wheel slippage. The setting of the selectively adjustable timer adjustment control causes C1 the CPU to maintain biasing clutch 28 fully engaged only for some predetermined interval of time, whereafter the biasing clutch is disengaged.

The CPU continuously samples and re-analyzes updated input signals from the sensors 41 and 43 and from the other input sources SW, R1 and R2 to ascertain if excessive slippage is occurring for the selected interval of time and, if so, again effects biasing clutch lockup for a desired interval of time. The predetermined interval of time during which clutch 28 is locked up is adjusted by means of timer control C1 and timing circuit CT to take into account the various types of operating conditions.

Central processing unit CPU monitors various functions continually. As previously explained, the information fed to central processing unit CPU consists of the gear range transmission 2 is operating in at that time, the transmission input shaft 34 rotational velocity from sensor 41, the differential front output shaft 9 rotational velocity from sensor 43 and the transmission range selector switch SW position.

Referring to FIG. 5, the routine carried out by the control means starts with step 46 which checks if a biasing clutch function was selected by the operator using switch SW. A negative response would result in differential clutch 28 being turned off or left off. If the answer is positive, the system proceeds to the next step 47.

At step 47, the CPU analyzes if the selected transmission gear range is suitable for use of biasing clutch 28, since engagement of biasing clutch 28 in high ranges or high vehicle speeds is not desirable. A "no" means that the differential BD will be left off or turned off.

A "yes" would lead into step 48, the speed sensor fault "evaluation" which may deny the validity of the perceived speeds as relayed by the speed sensor circuit. A positive result here calls for the need to further limit operation of the differential lock to certain gear ranges, for example, first range only. The signal is further processed in step 50 where the decision to turn the differential lock on or off is made dependent upon the gear range selected.

A negative answer out of the speed sensor fault 48 evaluation step leads to step 49 where the variance between the input speed sensor 41 signal and the output speed sensor 43 signal based upon the transmission gear ratio is calculated and fed into the "wheel slip detected" function 51. If the wheel slip detector 51 result is positive, the "slip timer running" evaluation 52 will be executed. A "no" here leads to step 55 starting the slip timer. Subsequent execution of the routine will result in a positive answer in step 52 which then will check the slip timer function in step 54. The slip timer routine allows for a delay between disengagement of the differential biasing clutch 28 and susbequent re-engagement, if wheel slip conditions still exist. A negative answer in step 54 means that the slip timer is running (step 52) and the time has not elapsed in which case no action is taken. A positive result in step 54 leads to step 57, the "start 'on' timer" action and subsequent step 58, the "turn differential lock on" function.

Subsequent routine execution will typically result in the step 56 execution resulting in a negative response which would keep the differential biasing clutch engaged until the "on" timer has elapsed and a positive answer in step 56 feeds into step 59, clearing all timers and turning the differential lock off.

A "no" answer from the "wheel slip detected" 51 routine leads to step 53, the "vehicle speed" evaluation phase. If the vehicle speed sensed by the output speed pickup 43 is higher than desired for biasing clutch operation, the clutch 28 will either by turned off or left off. A detected vehicle speed within the operating range of biasing clutch 28 will lead to step 56, the "on time elapsed" check 56. This function evaluates if the "on timer" 57 from a prior routine execution has elapsed, in which case the differential clutch is disengaged, or if the timer is still running, which leaves the differential clutch engaged per step 58.

We claim:

1. In a power transmission system for a vehicle:
    a change gear transmission (2) having a rotatable transmission power input shaft (34) connected to be driven by a prime mover (E), at least one selectively operable transmission clutch pack (37,38) and a rotatable transmission power output shaft (39);
    a gear range selector (SW) for selectively operating said transmission clutch pack (37,38)
    a differential (BD) comprising a pair of differential outputs shafts (9,10) for driving vehicle wheels and which proportions torque to said output shafts (9,10) by means of differential gearing regardless of the speeds of said output shafts (9,10);
    means including a rotatable power input member (11) driven by said transmission power output shaft (39) for effecting rotation of said output shafts (9,10);
    a selectively operable biasing clutch (28) engageable to effect rotation of both output shafts (9,10) at the same speed regardless of the torque proportioning ratio between said output shafts (9,10);
    and control means, responsive to a predetermined speed ratio band between the rotational speeds of said power input member and one of said output shafts (9,10) indicative of a difference in rotational speed between said output shafts (9,10) resulting from wheel slip, to effect engagement of said biasing clutch (28), said control means comprising:
    a first sensor (41) for sensing the rotational speed of said rotatable transmission power input shaft (34),
    a second sensor (43) for sensing the rotational speed of only one of said differential out shafts (9,10),
    means for providing a status signal indicative of the status of said one transmission clutch pack (37,38),
    and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch (28) in the event of said predetermined difference.

2. A power transmission system according to claim 1 wherein said control means effects engagement of said biasing clutch (28) for a predetermined interval of time, in the event said predetermined speed ratio exists for a predetermined interval of time.

3. A power transmission system according to claim 2 wherein said control means periodically samples said speed ratio.

4. In a power transmission system for a vehicle:
    a change gear transmission (2) having a rotatable transmission power input shaft (34) connected to be driven by a prime mover (E), at least one selectively operable transmission clutch pack (37,38) and a rotatable transmission power output shaft (39);
    a gear range selector (SW) for selectively operating said one transmission clutch pack (37,38);
    a differential (BD) comprising a rotatable power input member (11) and a pair of rotatable output members (9,10) for driving vehicle wheels, said differential operable to proportion torque to said output member (9,10) by means of differential gearing regardless of the speeds of said output members (9,10);

a selectively operable clutch (28) located between said rotatable power input member (11) and one of said output members (9,10) and engageable to connect said rotatable power input member (11) to said one output member (9,10) so that both output members (9,10) rotate at the same speed;

and control means responsive to a difference in rotational speeds between said power input member (11) and one of said output members (9,10) indicative of a difference in rotational speeds between said output members (9,10) resulting from wheel slip to effect engagement of said clutch (28), said control means comprising:

a first sensor (41) for sensing the rotational speed of said rotatable transmission power input shaft (34), a second sensor (43) for sensing the rotational speed of only one of said differential output shafts (9,10), means for providing a status signal indicative of the status of said one transmission clutch pack (37,38), and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch (28) in the event of said predetermined difference.

5. In a power transmission system for a vehicle:
a change gear transmission (2) having a transmission power input shaft (36) and a transmission power output shaft (39) and selectively operable clutch packs (37,38) therebetween;
a gear range selector (SW) for selectively operating said transmission clutch packs (37,38);
a differential comprising a rotatable power input member (11) connected to said power output shaft (39) of said transmission (2) and further comprising a pair of rotatable differential output members (9,10) rotatably driven by said rotatable power input member (11) for driving vehicle wheels, said output members (9,10) being rotatably driven by means of differential gearing which proportions torque to said output members (9,10) regardless of the speeds of said output members (9,10);
a selectively operable clutch (28) located between said rotatable power input member (11) and one of said differential output members (9,10) and engageable to connect said rotatable power input member (11) to said one output member (9,10) so that both output members (9,10) rotate at the same speed;
and control means responsive to a difference in rotational speeds between said power input shaft (34) of said transmission (2) and one of said output members (9,10), taking into account speed changes resulting from operation of said clutch packs (37,38), indicative of a difference in rotational speeds between said output members (9,10) resulting from wheel slip to effect engagement of said clutch (28), said control means comprising:
a first sensor (41) for sensing the rotational speed of said rotatable transmission power input shaft (34), a second sensor (43) for sensing the rotational speed of only one of said differential output shafts (9,10),
means for providing a status signal indicative of the status of said one transmission clutch pack (37,38),
and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch (28) in the event of said predetermined difference.

6. A power transmission system according to claim 5 wherein said control means comprises timer means operable to effect engagement of said clutch (28) in the event said ratio is different from said predetermined ratio band for a predetermined interval of time and to effect disengagement of said clutch (28) after a predetermined interval of time unless said difference in said rotational speeds between said output member (9,10) still exists.

7. In a power transmission system for a vehicle:
a change gear transmission (2) having a rotatable transmission power input shaft (34) connected to be driven by a prime mover (E), at least one selectively operable transmission clutch pack (37,38) and a rotatable transmission power output shaft (39);
a gear range selector (SW) for selectively operating said transmission clutch pack (37,38);
a differential (BD) including a rotatable pinion carrier (11) driven by said transmission power output shaft (39) and a pair of rotatable output shafts (9,10) rotatably driven by said rotatable pinion carrier (11) for driving vehicle wheels, said differential (BD) comprising differential gearing which proportions torque to said output shafts (9,10) regardless of the speeds of said output shafts (9,10);
a friction-type clutch (28) operatively connected between one of said output shafts (9) and said rotatable pinion carrier (11) and having a disengaged condition and an engaged condition, said clutch (28) when engaged effecting connection of said rotatable pinion carrier (11) and said one output shaft (9) whereby rotation of said pinion carrier (11) effects rotation of both output shafts (9,10) at the same rotational speed relative to each other;
a rotatable transmission power input shaft (34) for effecting rotation of said pinion carrier (11);
and control means (41,43,EC,29,33,33a) responsive to a predetermined difference in rotational speeds between said rotatable shaft (34) and one of said output shafts (9,10) indicative of a difference in rotational speeds of said output shafts (9,10) relative to each other evidencing wheel slip of the wheels driven by said output shafts (9,10) to effect engagement of said clutch (28) and thereby effect rotation of both output shafts (9,10) at the same rotational speed relative to each other, said control means comprising:
a first sensor (41) for sensing the rotational speed of said rotatable transmission power input shaft (34),
a second sensor (43) for sensing the rotational speed of only one of said differential output shafts (9,10), means for providing a status signal indicative of the status of said one transmission clutch pack (37,38), and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch (28) in the event of said predetermined difference.

8. In a four-wheel drive vehicle:

an engine;

front and rear wheels;

a transmission system including a gear change transmission having a rotatable power input member (34) driven by said engine, a clutch pack (37,38) and means for operating said clutch pack and a differential driven by said transmission and comprising a pair of differential output shafts (9,10) for driving said front and rear wheels, said differential comprising a selectively operable biasing clutch;

and control means responsive to a predetermined speed ratio between said rotatable power input member and one of said output shafts, taking into account the status of said clutch pack, indicative of slippage between said front and rear wheels to effect temporary engagement of said biasing clutch and elimination of slippage, said control means comprising:

a first sensor (41) for sensing the rotational speed of said rotatable power input member, a second sensor (43) for sensing the rotational speed of only one of said differential output shafts (9,10), means for providing a status signal indicative of the status of said clutch pack (37,38), and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch in the event of said predetermined difference.

9. In a four-wheel drive vehicle:

an engine (E);

front and rear wheels;

a selectively shiftable change gear transmission (2) driven by said engine (E) and including a rotatable transmission power input shaft (34) connected to be driven by said engine (E), at least one selectively operable transmission clutch pack (37,38) and a rotatable transmission power output shaft (39);

a gear range selector (SW) for selectively operating said transmission clutch pack (37,38);

a differential (BD) driven by said transmission and comprising a pair of output shafts for driving said front and rear wheels, said differential comprising a selectively operable biasing clutch;

and control means responsive to a predetermined speed ratio between said rotatable power input shaft of said transmission and one of said pair of output shafts of said differential, taking into account the shift range selected for said transmission, indicative of slippage between said front and rear wheels to effect temporary engagement of said biasing clutch and elimination of slippage, said control means comprising:

a first sensor (41) for sensing the rotational speed of said rotatable power input shaft (34), a second sensor (43) for sensing the rotational speed of only one of said differential output shafts (9,10), means for providing a status signal indicative of the status of said one transmission clutch pack (37,38), and an electronic central processing unit (CPU) for receiving and processing a signal from said first sensor (41) and said status signal to calculate the input speed of said differential and for receiving and processing a signal from said second sensor (43) and said calculated input speed of said differential to ascertain if there is a predetermined difference in rotational speed between said differential output shafts (9,10) resulting from wheel slip, and for providing a control signal to effect engagement of said biasing clutch (28) in the event of said predetermined difference.

* * * * *